United States Patent [19]
Fukui

[11] Patent Number: 5,839,005
[45] Date of Patent: Nov. 17, 1998

[54] FLASH PHOTOGRAPHING SYSTEM

[75] Inventor: Hajime Fukui, Tokyo, Japan

[73] Assignee: Canon Kabushiki Kaisha, Tokyo, Japan

[21] Appl. No.: 867,253

[22] Filed: Jun. 2, 1997

[51] Int. Cl.⁶ .................................................. G03B 15/03
[52] U.S. Cl. ......................... 396/159; 396/161; 396/164
[58] Field of Search .................................... 396/155, 159, 396/160, 161, 162, 164

[56] References Cited

U.S. PATENT DOCUMENTS

| | | | |
|---|---|---|---|
| 4,227,808 | 10/1980 | Yuasa | 356/218 |
| 5,504,552 | 4/1996 | Kotoh et al. | 354/413 |
| 5,581,074 | 12/1996 | Yoshida | 250/205 |

FOREIGN PATENT DOCUMENTS 7151701   6/1995   Japan .

OTHER PUBLICATIONS

Patent Abstracts of Japan No. JP 07 151701 A, published Jun. 16, 1995.

*Primary Examiner*—Safet Metjahic
*Assistant Examiner*—Nicholas T. Tuccillo
*Attorney, Agent, or Firm*—Robin, Blecker & Daley

[57] ABSTRACT

In a flash photographing system having a light receiving circuit arranged to receive a reflected light from an object caused by a light flux emitted from a flash tube and controlling the amount of flash light emission according to the amount of light thus received, the output of the light receiving circuit is inputted to an analog-to-digital conversion circuit to be converted into digital values at intervals of a predetermined period, and an adding process on the digital values is performed to detect the amount of received light, so that the amount of flash light emission is controlled.

9 Claims, 17 Drawing Sheets

F I G. 7
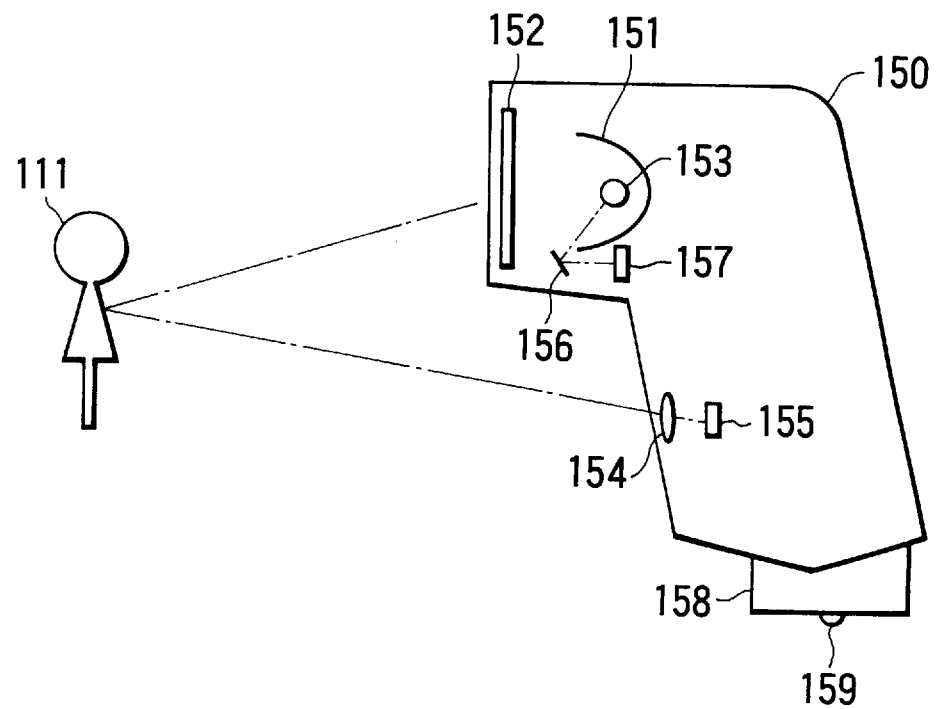

FLASH PHOTOGRAPHING SYSTEM

BACKGROUND OF THE INVENTION

1. Field of the Invention

This invention relates to an improvement of a flash device which is built in or mounted on a camera.

2. Description of Related Art

Known exposure control methods which have been popularly employed for use of a flash device include a method called an external measuring light control method and another method called a TTL (through the taking lens) light control method. In the external measuring light control method, light emitted from a flash device and reflected by an object to be photographed is received by an optical system other than a photo-taking lens, the amount of the received light is integrated, and light emission by the flash device is brought to a stop at a point of time when the integral amount of the received light reaches a predetermined value. In the TTL light control method, light emitted from a flash device and reflected by an object to be photographed during flash photography is received through a photo-taking lens and is measured and integrated, for example, through reflection made by a film surface, and light emission by the flash device is brought to a stop at a point of time when the integral amount of the received light reaches a predetermined value.

Here, the above-stated conventional TTL light control method is described with reference to FIG. 15 as follows.

In FIG. 15, the illustration includes a photo-taking lens 400, a mirror 401, a focusing screen 402, a pentagonal prism 403, an eyepiece 404, a film 405, a light receiving element 407 for TTL light measurement, a lens 406 for imaging, on the light receiving element 407, a reflected light coming from a photographing object 411 and projected onto the surface of the film 405, an integrating circuit 408, a xenon (discharge) tube 409 for emission of flash light, and a reflection shade 410 arranged for efficient projection of the flash light onto the photographing object 411.

FIG. 16 is a block diagram showing the circuit arrangement of a flash device included in a camera-flash device system which is arranged as shown in FIG. 15.

Referring to FIG. 16, a DC/DC converter 440 is arranged to act as a booster circuit to boost a battery voltage up to several hundred volts in accordance with an instruction of a microcomputer 445. A main capacitor C1 is arranged to be charged with the voltage boosted by the DC/DC converter 440. A trigger circuit 441 is arranged to output a trigger signal in accordance with an instruction of the microcomputer 445 to have a high voltage of several thousand volts applied to the trigger electrode of the xenon tube 409 to cause the xenon tube 409 to make a discharge at the time of emitting light from the flash device. Then, the xenon tube 409 discharges, as optical energy, the energy of electric charge stored at the main capacitor C1.

A light emission control circuit 442, which is composed of a switching element such as an IGBT (insulated gate bipolar transistor), is arranged to be rendered conductive by the microcomputer 445 to allow a current to flow to the xenon tube 409 when the trigger voltage is applied as mentioned above, and to be put into a cut-off state to cut off the current flow to the xenon tube 409 in bringing the light emission to a stop. A comparator 443 is arranged to have a predetermined comparison voltage applied to its inverting input terminal and the output of the integrating circuit 408 applied to its non-inverting input terminal and to invert its output when the integral amount of the reflected light coming from the object 411 as a result of light emission by the xenon tube 409 reaches a predetermined level. The microcomputer 445 is employed as a control means for control over the light emission by the flash device.

The microcomputer 445 is provided with various terminals as follows.

A control output terminal CNT is provided for controlling a start and a stop of oscillation of the DC/DC converter 440. An output terminal TRIG is provided for instructing the trigger circuit 441 to generate a light emission trigger signal. An output terminal XON is provided for control over conductive and cut-off states of the light emission control circuit 442. An input terminal STOP is provided for reading the output of the comparator 443. An output terminal START is provided for instructing the integrating circuit 408 to start and stop its integrating action.

FIG. 17 shows by way of example the circuit arrangement of the integrating circuit 408.

Referring to FIG. 17, the integrating circuit 408 includes a light receiving element 407, resistors 420 and 421, an operational amplifier 422 arranged to amplify the output of the light receiving element 407, an integrating capacitor 423, an operational amplifier 424, an analog switch 425, and a reference power supply 426. The output of the light receiving element 407 is supplied to the capacitor 423 when the analog switch 425 is turned off.

FIG. 18 shows the waveform of light emitted by the xenon tube 409 and an output obtained by integrating the reflected light coming from the object 411. The TTL light control operation of the circuit arrangement shown in FIG. 16 is described below with reference to FIG. 18.

The xenon tube 409 begins to emit light when the microcomputer 445 instructs through its terminal TRIG the trigger circuit 441 to generate a trigger signal at a point of time t0. The amount of the light emission comes to gradually decrease, as indicated by a thin line in FIG. 18, after it reaches an amount of light corresponding to a maximum current which is determined by the power supply and the internal resistance of the xenon tube 409. Meanwhile, the output of the integrating circuit 408 which is obtained by integrating the reflected light from the object 411 increases with the lapse of time, as indicated by a thick line in FIG. 18. The comparator 443 comes to invert its output when the output of the integrating circuit 408 reaches a predetermined amount. Then, the microcomputer 445 inverts the output of the terminal XON to bring the light emission of the flash device to a stop by bringing the light emission control circuit 442 into a cut-off state. An apposite amount of light emission can be obtained in this manner by the TTL light control.

BRIEF SUMMARY OF THE INVENTION

It is an object of this invention to provide a flash photographing system arranged to be capable of detecting the amount of light emission by a flash tube without recourse to an analog integrating circuit.

In accordance with one aspect of the invention, there is provided a flash photographing system arranged to control light emission by detecting an amount of flash light emission, in which light emitted from a flash tube and reflected from an object is received or light emitted from the flash tube is directly received by a light receiving circuit, an analog output of the light receiving circuit is converted into a digital value by an analog-to-digital conversion circuit, and digital values obtained at the analog-to-digital conversion circuit at intervals of a predetermined timing are subjected to an adding process, so as to detect the amount of flash light emission.

In accordance with another aspect of the invention, there is provided a flash photographing system capable of eliminating an adverse effect of any noise light by comparing the latest digital value with the previously obtained digital value among the digital values obtained at intervals of the predetermined timing and by determining that a noise light has been detected, when a result of the comparison indicates a predetermined relation between the digital values compared.

The above and other objects and features of the invention will become apparent from the following detailed description of embodiments thereof taken in connection with the accompanying drawings.

BRIEF DESCRIPTION OF THE SEVERAL VIEWS OF THE DRAWING

FIG. 7 schematically shows the arrangement of a flash device according to a second embodiment of the invention.

DETAILED DESCRIPTION OF THE INVENTION

Hereinafter, preferred embodiments of this invention will be described in detail with reference to the drawings.

(First embodiment)

Figure 1:
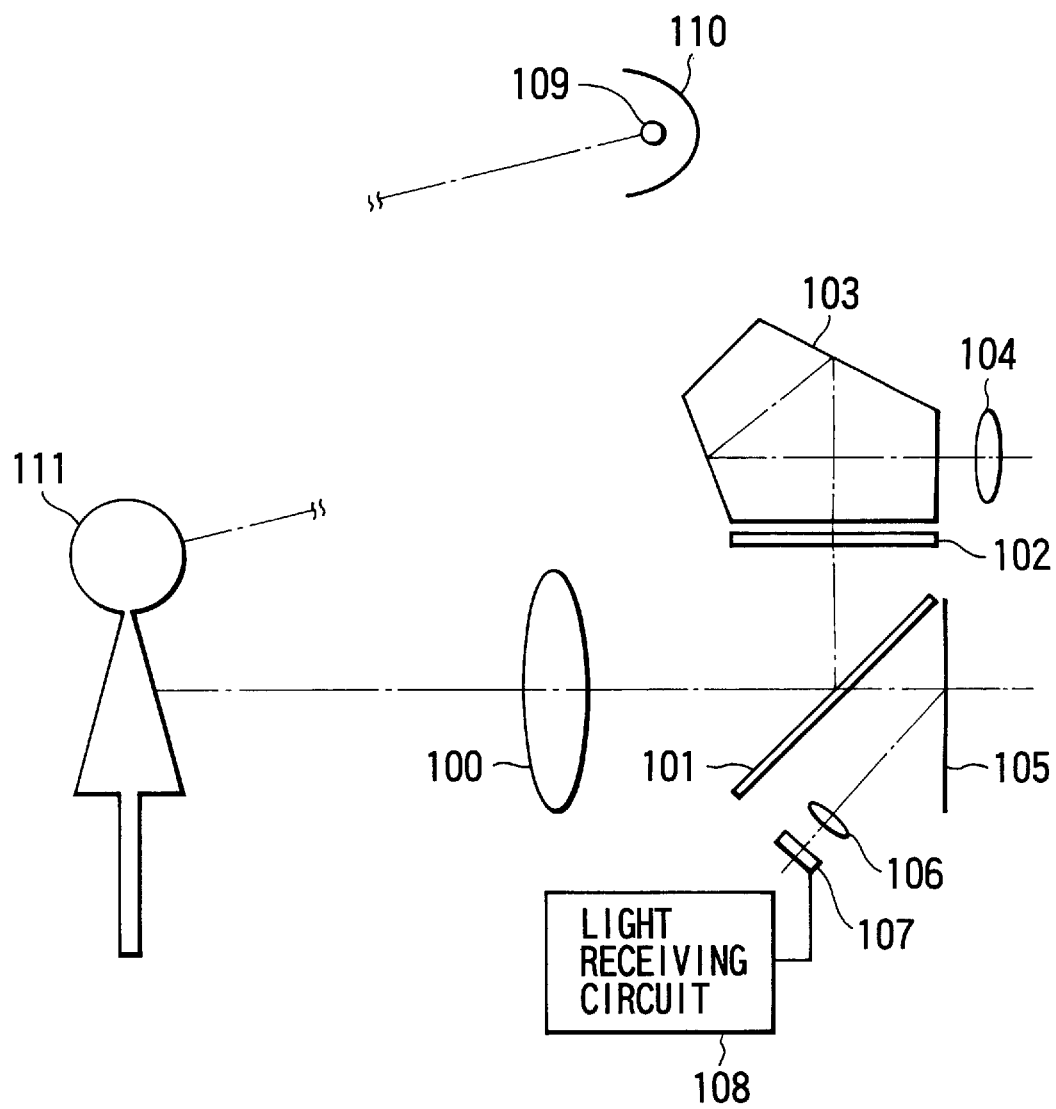
FIG. 1 is a layout view schematically showing optical elements of a camera-flash device system according to a first embodiment of this invention.

FIG. 1 shows the arrangement of essential parts of a camera-flash device system of the film-surface reflecting, TTL light control type, according to a first embodiment of the invention. Referring to FIG. 1, the illustration includes a photo-taking lens 100, a mirror 101, a focusing screen 102, a pentagonal prism 103, an eyepiece 104, a film 105, a light receiving element 107 for TTL light measurement, a lens 106 arranged to image on the light receiving element 107 a reflected light coming from an object 111 and projected onto the surface of the film 105, a light receiving circuit 108, a xenon tube 109 for flash emission, and a reflection shade 110 arranged to efficiently project flash light onto the object 111.

Figure 2:
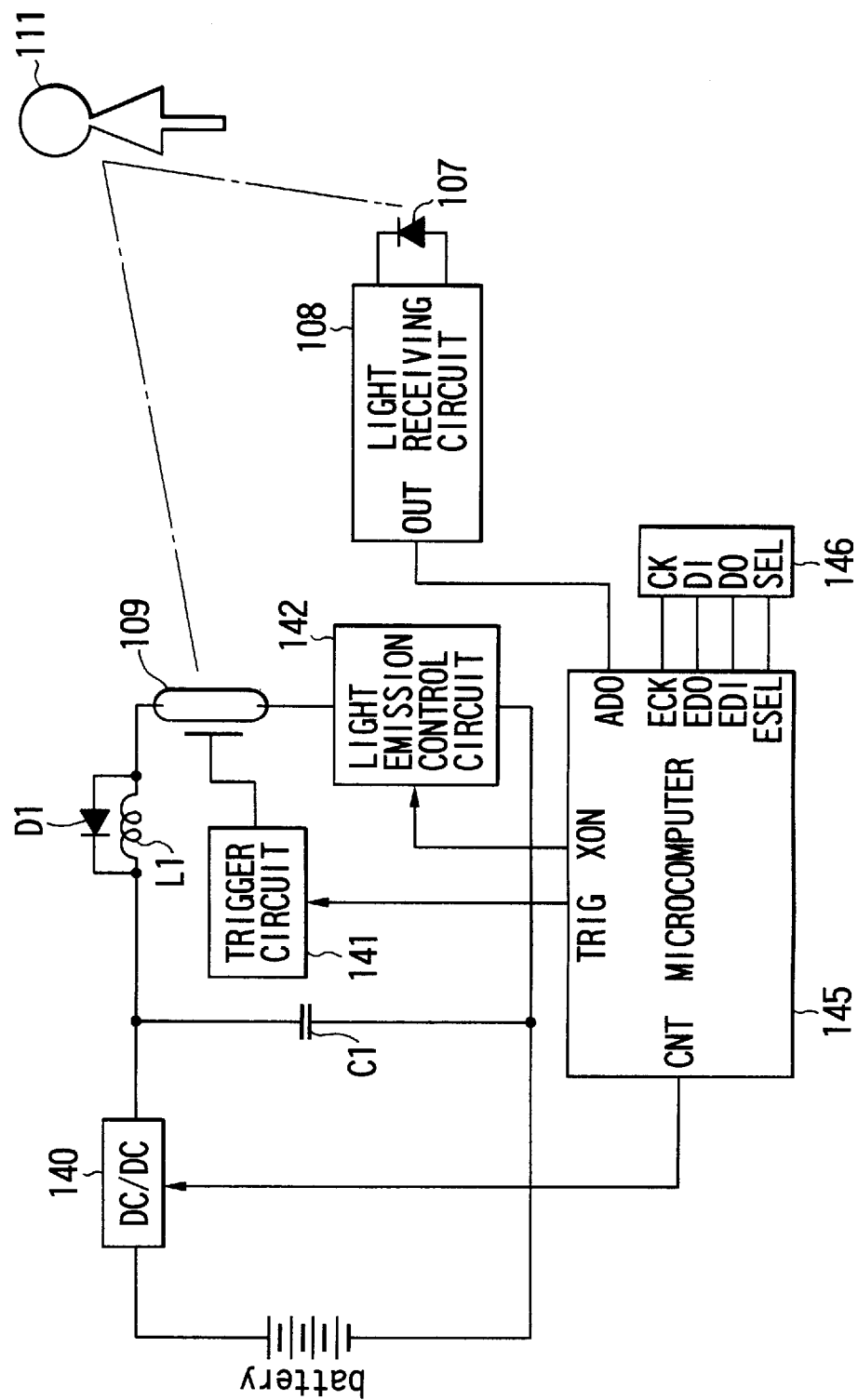
FIG. 2 is a block diagram showing the circuit arrangement of a flash device according to the first embodiment of the invention.

FIG. 2 shows the circuit arrangement of a flash device of the camera-flash device system shown in FIG. 1. In FIG. 2, all parts corresponding to those of FIG. 1 are indicated by the same reference numerals as those shown in FIG. 1.

Referring to FIG. 2, a DC/DC converter 140 is arranged to act as a booster circuit to boost a battery voltage up to several hundred volts in accordance with an instruction from a microcomputer 145. A main capacitor C1 is arranged to be charged with the voltage boosted by the DC/DC converter 140. A trigger circuit 141 is arranged to output a trigger signal in accordance with an instruction of the microcomputer 145 to have a high voltage of several thousand volts applied to the trigger electrode of the xenon tube 109 to cause the xenon tube 109 to make a discharge in emitting light from the flash device. Then, the xenon tube 109 discharges, as an optical energy, the energy of electric charge stored at the main capacitor C1. A light emission control circuit 142, which is composed of a switching element such as an IGBT (insulated gate bipolar transistor), is arranged to be rendered conductive by the microcomputer 145 to allow a current to flow to the xenon tube 109 when the trigger voltage is applied as mentioned above, and to be put into a cut-off state to cut off the current flow to the xenon tube 109 in bringing the light emission to a stop. The microcomputer 145 is employed as a control means for control over light emission by the flash device. An EEPROM 146 is arranged as a rewritable storage means.

The microcomputer 145 is provided with various terminals as follows.

A control output terminal CNT is provided for controlling a start and a stop of oscillation of the DC/DC converter 140. An output terminal TRIG is provided for instructing the trigger circuit 141 to generate a light emission trigger signal. An output terminal XON is provided for control over conductive and cut-off states of the light emission control circuit 142. An A/D (analog-to-digital) conversion input terminal AD0 is provided for reading the output of the light receiving circuit 108 while converting it into a digital value. Terminals ECK, EDO, EDI and ESEL are provided for serial communication with the EEPROM 146. To be more specific, the terminal ECK is an output terminal for a synchronizing clock signal. The terminal EDO is an output terminal for serial data. The terminal EDI is an input terminal for serial data. The terminal ESEL is an enable terminal provided for selecting communication with the EEPROM 146.

Figure 3:
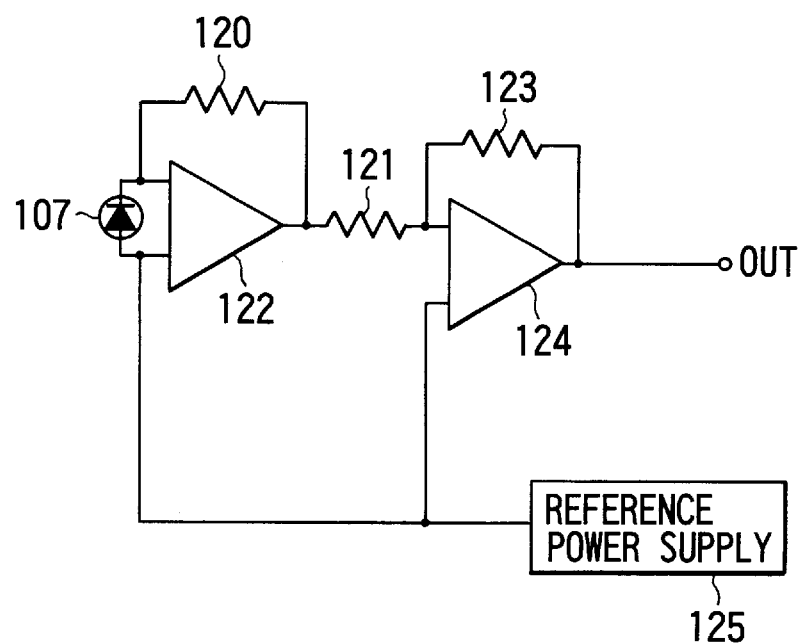
FIG. 3 is a circuit diagram showing in detail a light receiving circuit shown in FIG. 2.

FIG. 3 shows by way of example the circuit arrangement of the light receiving circuit 108.

Referring to FIG. 3, the light receiving circuit 108 includes a light receiving element 107, resistors 120 and 121, an operational amplifier 122 arranged to amplify the output of the light receiving element 107, a resistor 123, an operational amplifier 124 arranged to amplify the output of the operational amplifier 122 which is a light receiving head amplifier, and a reference power supply 125 provided for offsetting the input ends of the operational amplifiers 122 and 124.

Figure 4A:
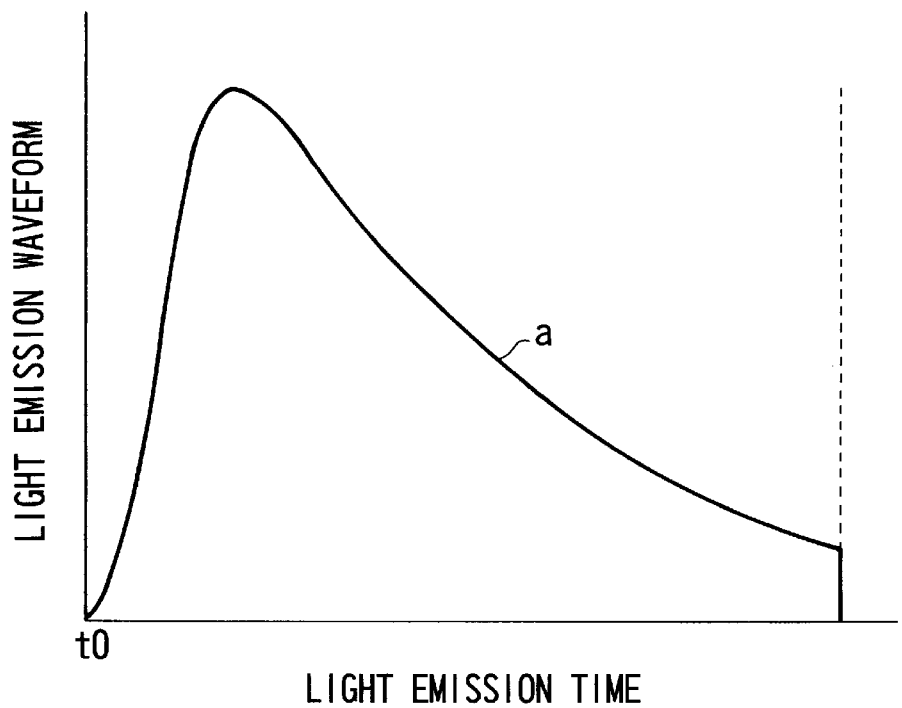
FIGS. 4(A) and 4(B) are diagrams for explaining an operational integrating action in the first embodiment of the invention.
Figure 4B:
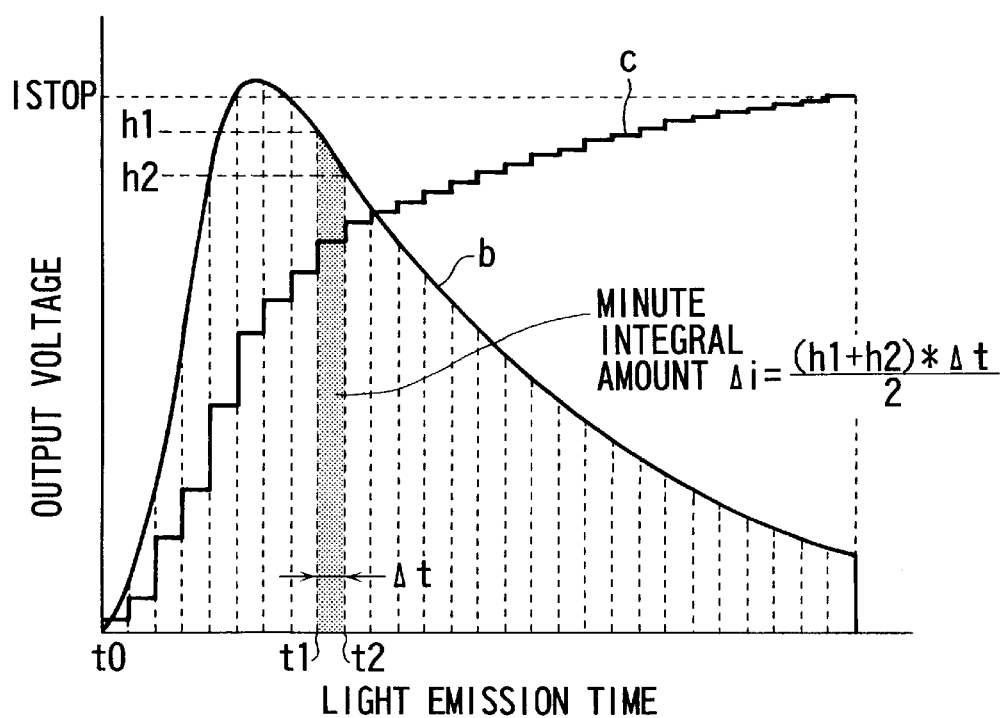

FIGS. 4(A) and 4(B) show the waveform "a" of light emission by the xenon tube 109, an output "b" of the light receiving circuit 108 and an output "c" obtained by an operational integrating action on the output "b". The TTL light control operation of the circuit arrangement shown in FIG. 2 is described below with reference to FIGS. 4(A) and 4(B).

The xenon tube 109 begins to emit light when the microcomputer 145 instructs through its terminal TRIG the trigger circuit 141 to generate a trigger signal at a point of time t0. The amount of the light emission comes to gradually decrease after it reaches an amount of light corresponding to a maximum current which is determined by the power supply and the internal resistance of the xenon tube 109 as indicated by the light emission waveform "a" in FIG. 4(A).

The output "b" of the light receiving circuit 108, which receives a reflected light from the object 111 through reflection by the film surface, becomes similar to the light emission waveform "a", as shown in FIG. 4(B). The microcomputer 145 reads the output "b" through the A/D conversion input terminal AD0 at predetermined intervals after the start of light emission, and obtains a minute integral amount $\Delta i$ in accordance with the following formula, wherein h1 represents the preceding A/D converted value, h2 represents the current A/D converted value, and $\Delta t$ represents a sampling interval:

minute integral amount $\Delta i = \{(h1+h2) * \Delta t\}/2$.

The above computing operation is repeated at the predetermined intervals after a light emission start time point t0, and the obtained minute integral amounts are added up, thereby obtaining a total integral amount as follows:

total integral amount $i = i + \Delta i$.

When the total integral amount reaches a predetermined integral amount, the microcomputer 145 brings the light emission to a stop by inverting the level of the terminal XON to a low level (Lo). An apposite amount of light emission can be obtained in this manner.

An integration level ISTOP at which the light emission is to be brought to a stop as shown in FIG. 4(B) is stored beforehand in the EEPROM 146 at the time of adjustment. This arrangement permits the level ISTOP to be electrically adjusted without having recourse to use of a variable resistor.

Processes to be executed by microcomputer 145 in controlling the light emission are next described with reference to FIG. 5 which is a flow chart.

Figure 5:
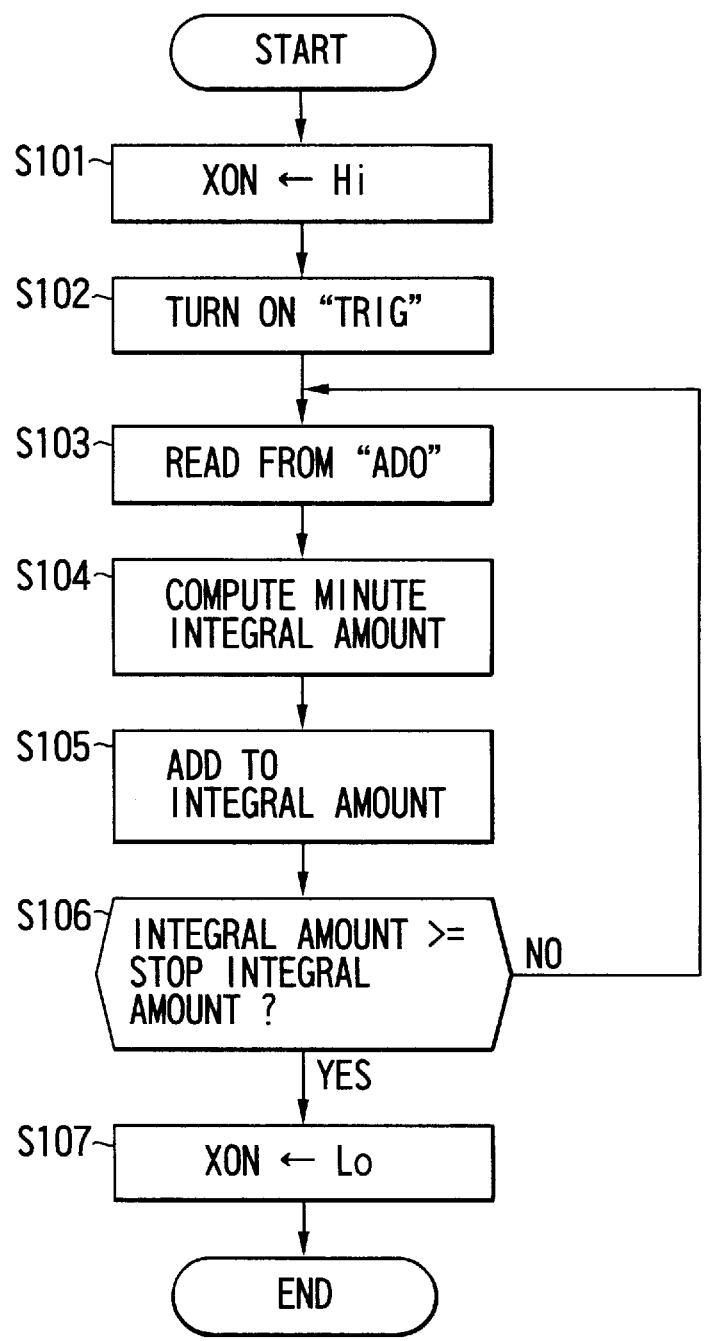
FIG. 5 is a flow chart showing a computing operation of the operational integrating action in the first embodiment of the invention.

At a step S101 shown in FIG. 5, the terminal XON is set at a high level (Hi) to set the light emission control circuit 142 into a conductive state in preparation for light emission.

At a step S102, the terminal TRIG is set at a high level (Hi) for a predetermined period of time to generate a high voltage at the trigger circuit 141. The xenon tube 109 is excited by the high voltage and is thus caused to begin to emit light.

At a step S103, the output of the light receiving circuit 108 is read through the A/D conversion input terminal AD0 at intervals of a predetermined sampling period. The output thus read is converted into a digital signal.

At a step S104, a minute integral amount $\Delta i$ within each predetermined sampling period is obtained in accordance with the following formula from the output of the light receiving circuit 108 read at the step S103:

minute integral amount $\Delta i = \{(h1+h2) * \Delta t\}/2$ wherein h1: an A/D converted value obtained last time, h2: an A/D converted value obtained this time, and $\Delta t$: a sampling interval.

Further, the level required for TTL light control varies with the setting value of film sensitivity, etc. The light control level can be more easily controlled by converting the light output into a power of 2. It is, therefore, preferable that the microcomputer is arranged to logarithmically convert the A/D conversion data in accordance with the following formula:

$$V0 = \log(k * Vin)$$

wherein

Vin: an output voltage of the light receiving circuit 108, and k: an adjustment coefficient for adjusting the dynamic range of the integral output.

In the meantime, due to a noise of the trigger circuit and a noise generated by the xenon tube, the A/D conversion output is sometimes detected in a spike-like shape. According to the conventional hardware arrangement, the A/D conversion output is integrated as it is, leaving the noises intact. Therefore, the result of the conventional integrating process has sometimes included a great error.

According to the operational integration in the first embodiment of the invention, on the other hand, the A/D conversion data obtained during one sampling interval to several sampling intervals is stored, the last A/D conversion data is compared with the current A/D conversion data, and, if the current A/D conversion data is found to greatly differ from the last A/D conversion data, the A/D conversion is considered to be incorrectly performed due to a noise. In such a case, the current A/D conversion data is corrected with the average of the A/D conversion data obtained at several previous times, so that the adverse effect of noises can be greatly mitigated.

Such a method for correcting the current A/D conversion data mentioned above is described below with reference to FIGS. 6(A) and 6(B).

Figure 6A:
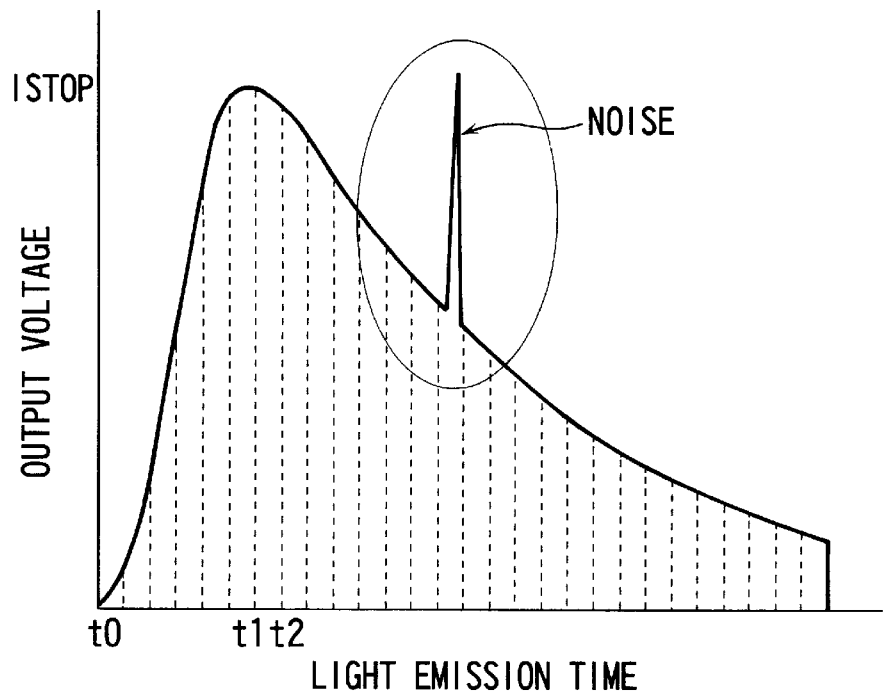
FIGS. 6(A) and 6(B) are diagrams for explaining an operation of determining a noise.
Figure 6B:
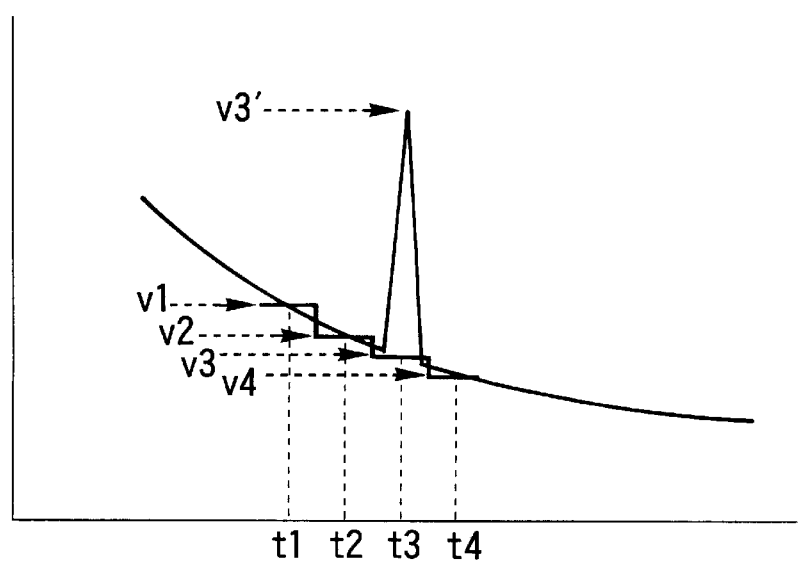

FIG. 6(A) shows a signal waveform obtained when a noise is mixed in a signal waveform outputted from the light receiving circuit 108 which monitors the waveform of light emission by the xenon tube 109. FIG. 6(B) shows in an enlarged state the part of FIG. 6(A) where the noise is mixed in.

In FIG. 6(B), the abscissa axis represents time for light emission. If no noise is mixed in the signal waveform, a voltage input to the terminal AD0 is a voltage v1 at a sampling time t1. In the same manner, the voltage input is a voltage v2 at a sampling time t2, is a voltage v3 at a sampling time t3 and is a voltage v4 at a sampling time t4. In a case where a noise takes place at the sampling time t3, however, the noise causes the voltage input to the terminal AD0 to become a voltage v3' at the sampling time t3 as indicated by a thick line.

In the case of a distinct noise such as the one mentioned above, the noise can be determined to be a noise either when a difference between a difference voltage (v3'−v2) obtained by the current sampling and a difference voltage (v2−v1) obtained by the last sampling becomes equal to or larger than a predetermined value or becomes equal to or larger than a discriminating voltage set with reference to a previous difference voltage between the current and last voltages sampled in the past. Noises also can be determined simply when the difference voltage (v3'−v2) between the current and last sampled voltages becomes equal to or larger than a predetermined value. In a case where a noise is determined in this manner, the currently sampled voltage data v3' is not used as integral data. In that case, the above-stated integrating process is performed by obtaining the current data v3 by a simple computing operation, for example, according to the following formula:

$$v3=v2-(v1-v2).$$

Further, with respect to the above-stated data correcting method, the data may be obtained by the method of least squares on the basis of values of A/D converted data read several times in the past. The noise determining and data correcting processes are carried out between the steps S103 and S104.

At a step S105, the minute integral amount Δi obtained at the step S104 is added to a total integral amount to obtain an integral amount "int" corresponding to an amount of light emitted since the commencement of the light emission.

$$\text{integral amount int}=\text{int}+\Delta i.$$

At a step S106, the integral amount "int" obtained at the step S105 is compared with a read value of a light-emission stopping integral amount written in the EEPROM 146 at the time of adjustment (data stored in the EEPROM). If the integral amount "int" is found to be equal to or larger than the EEPROM-stored data, the flow proceeds to a step S107. If the EEPROM-stored data is found to be larger than the integral amount "int", the flow returns to the step S103 to repeat the above-stated operational integrating process.

At the step S107, the level of the terminal XON is inverted to a low level to bring the light emission control circuit 142 into a cut-off state. The light emission by the xenon tube 109 is thus brought to a stop, and the flow of light emission processes comes to an end.

As described above, according to the arrangement of the first embodiment, without recourse to an integrating circuit for controlling the amount of light emission, the amount of light emission can be controlled by causing the output of photo-electric conversion means which converts the light emission of the xenon tube into an electrical signal to be directly A/D converted in real time into a digital value at predetermined sampling intervals, and by performing a computing operation to obtain an integral amount of light emission on the basis of the digital values thus obtained. The amount of light emission from the flash device thus can be adequately controlled without necessitating use of any integrating circuit that must be arranged to handle minute signals.

Another advantage of the first embodiment lies in the following point. The control circuit of the flash device can be simplified to a great extent according to the arrangement of the first embodiment, because the A/D conversion output obtained by A/D converting the output of the light receiving circuit 108, i.e., an output of a light receiving element, is logarithmically converted by a computing process, so that the light output can be logarithmically converted without recourse to an expensive logarithmic conversion circuit which is extremely sensitive to temperature.

A further advantage of the first embodiment lies in that a light emission stopping level at which the light emission is to be brought to a stop through the operational integrating process is arranged to be stored in storage means such as an EEPROM or the like at the time of carrying out adjustment work. This arrangement permits electrical adjustment without recourse to adjustment means such as a variable resistor or the like, so that the process of adjustment can be simplified.

A still further advantage of the embodiment lies in the following arrangement. The A/D converted data currently sampled is compared with the A/D converted data obtained the previous several times. If the result of the comparison indicates an adverse effect of a noise, the A/D converted data currently obtained is corrected through the computing operation steps described above. That arrangement permits highly accurate light emission control by accurately carrying out the integrating process without any adverse effect of noises.

(Second Embodiment)

In the case of a second embodiment of the invention, the light emission control circuit arranged to control light emission by the operational integrating process in the first embodiment described above is applied to an external light control type flash device. In this case, a manual light emission control function to be carried out according to an instructed amount of light is added to the control circuit.

FIG. 7 shows the whole arrangement of the flash device according to the second embodiment of the invention.

Referring to FIG. 7, the illustration includes a flash device housing 150, a reflection shade 151, a Fresnel lens 152 and a xenon tube 153 which is employed as light emitting means. The light output of the xenon tube 153 can be efficiently projected onto a photographing object 111 by virtue of the reflection shade 151 and the Fresnel lens 152. The flash device is provided with a condenser lens 154 and a first light receiving element 155 which is employed as light receiving means. When the light emitted from the xenon tube 153 is reflected by the object 111, the reflected light from the object 111 is received by the light receiving element 155 via the condenser lens 154. A reflection plate 156 is arranged to guide the light of the xenon tube 153 to a second light receiving element 157. The second light receiving element 157 which is employed as light receiving means is arranged to directly monitor the light generated by the xenon tube 153 and to output a signal for control over the amount of light to be emitted in a manual light emission mode. A leg part 158 is provided for mounting the flash device unit on a camera. An X-sync contact 159 is arranged to receive a light emission signal from the camera.

Figure 8:
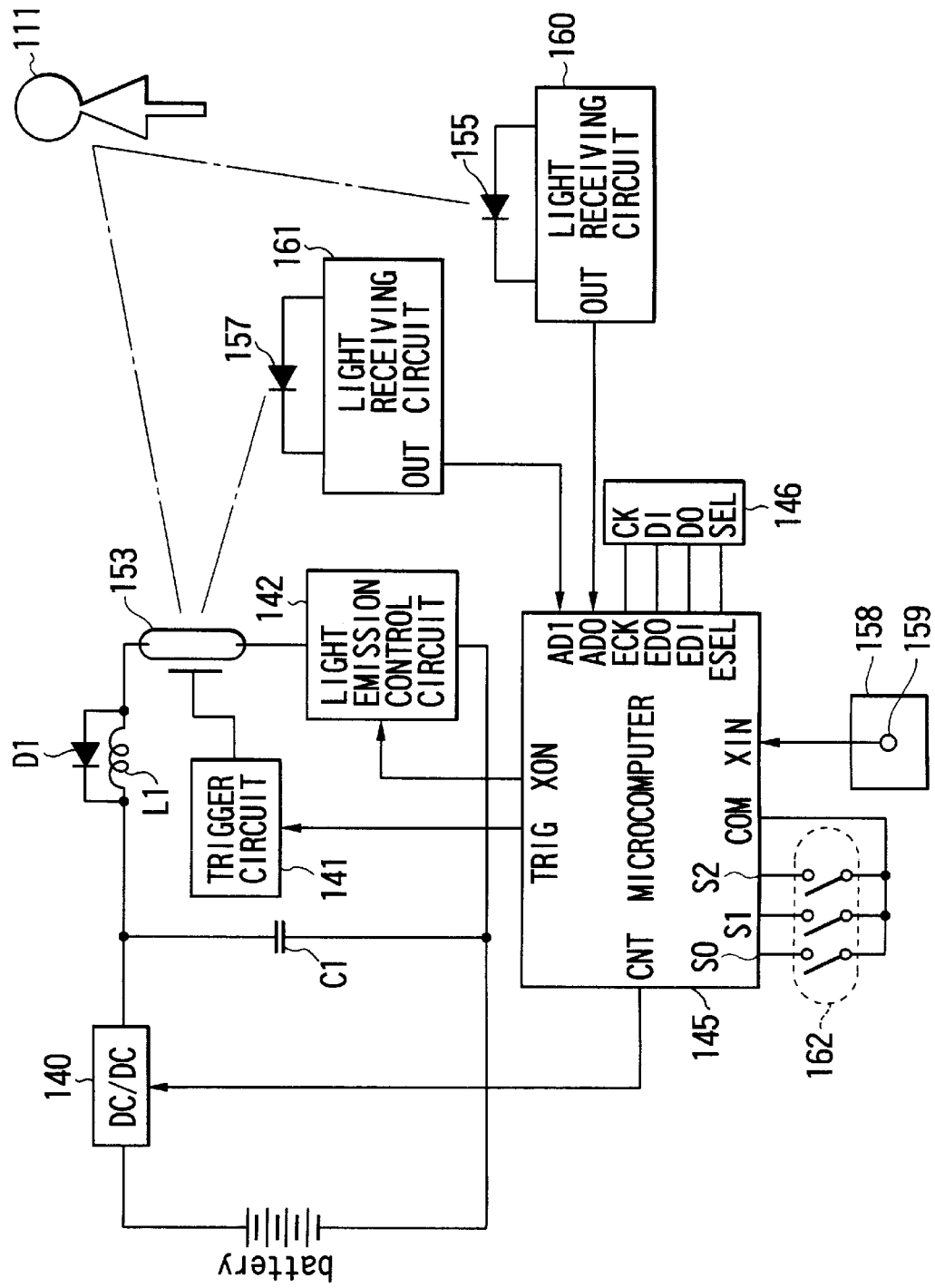
FIG. 8 is a block diagram showing the circuit arrangement of the flash device according to the second embodiment of the invention.

FIG. 8 is a block diagram showing the circuit arrangement of the flash device which is arranged as described above. All members that are the same as those shown in FIG. 2 are indicated by the same reference numerals as in FIG. 2, and their details are omitted from the following description.

Referring to FIG. 8, light receiving elements 155 and 157 are identical with the light receiving element 107 shown in FIG. 2. The first light receiving element 155 is arranged to receive the reflected light coming from the object 111. The second light receiving element 157 is arranged to directly monitor the light generated by the xenon tube 153. Light receiving circuits 160 and 161 are identical with the light receiving circuit 108 shown in FIG. 2. A switch 162 is provided for setting the operating mode of the flash device and is arranged to be set into eight kinds of combinations of three bits so as to set the external light control mode and an aperture value in the external light control mode and also to set a light amount setting value in the manual light emitting mode.

A microcomputer 145 which is included in the circuit arrangement of the second embodiment as a means for controlling the flash device has some terminals in addition to the terminals of the microcomputer of the first embodiment shown in FIG. 2. These additional terminals are arranged as follows.

An input terminal AD1 is an A/D (analog-to-digital conversion) input terminal which is provided for reading the output voltage of the light receiving circuit 161 and converting it into a digital signal, in the same manner as the input terminal AD0. Input terminals S0, S1 and S2 are input terminals provided for inputting the state of the above-stated mode setting switch 162. A terminal COM is arranged to permit inflow of a current of a level corresponding to the ground level of the mode setting switch 162. A terminal XIN is provided for input of a light emission trigger signal from the camera.

Figure 9:
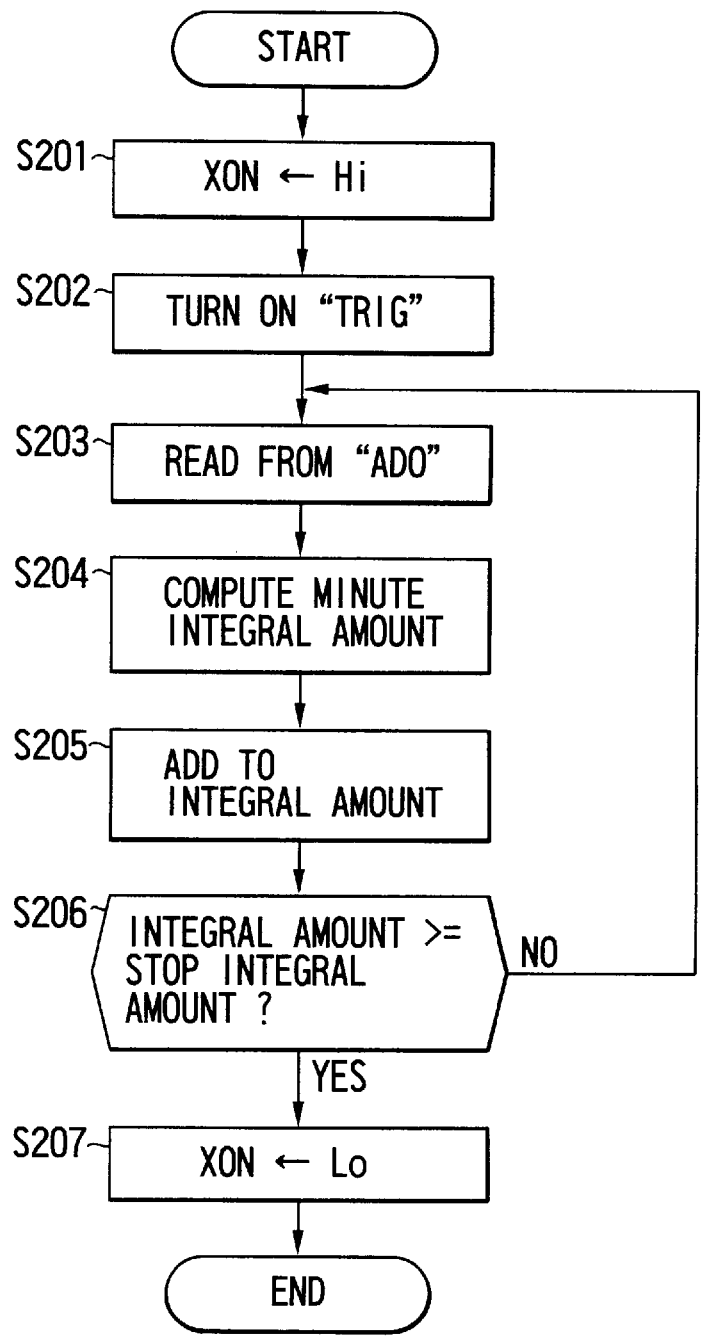
FIG. 9 is a flow chart showing a computing operation of the operational integrating action during an external light control mode in the second embodiment of the invention.

The light emission control to be performed in the external light control mode is next described with reference to the flow chart of FIG. 9 as follows.

<External Light Control Mode>

When the external light control mode is selected by the mode setting switch 162, the microcomputer 145 controls the amount of light emission by using the light receiving element 155 which is arranged to receive the reflected light from the photographing object 111.

At a step S201, when the level of the input terminal XIN which is a light emission trigger input terminal becomes low, the microcomputer 145 sets the terminal XON at a high level to bring the light emission control circuit 142 to a conductive state in preparation for light emission.

At a step S202, the terminal TRIG is set at a high level (Hi) for a predetermined period of time to generate a high voltage at the trigger circuit 141. The xenon tube 153 is excited by the high voltage and is thus caused to begin to emit light.

At a step S203, the output of the light receiving circuit 160 is read through the input terminal AD0 at predetermined sampling intervals. The output thus read is converted into a digital signal.

At a step S204, a minute integral amount Δi within a predetermined sampling period is obtained in accordance with the following formula from the output of the light receiving circuit 160 read at the step S203:

$$\text{minute integral amount } \Delta i = \{(h1+h2) * \Delta t\}/2$$

wherein h1: an A/D converted value obtained last time, h2: an A/D converted value obtained this time, and Δt: a sampling interval.

The A/D converted value is preferably subjected to a computing (arithmetic) operation process for logarithmic conversion and also to the operational process for eliminating the adverse effect of noises, in the same manner as in the case of the first embodiment described above.

At a step S205, an integral amount "int" which corresponds to the amount of light emission from the commencement of the light emission is obtained by adding the minute integral amount Δi obtained at the step S204 to a total integral amount, as expressed below:

$$\text{integral amount } int = int + \Delta i.$$

At a step S206, the integral amount "int" obtained at the step S205 is compared with a read value of a light-emission stopping integral amount written in the EEPROM 146 at the time of adjustment. If the integral amount "int" is found to be equal to or larger than the data stored in the EEPROM 146, the flow proceeds to a step S207. If the EEPROM-stored data is found to be larger than the integral amount "int", the flow returns to the step S203 to repeat the above-stated operational integrating process.

At the step S207, the level of the terminal XON is inverted to a low level to bring the light emission control circuit 142 into a cut-off state. The light emission by the xenon tube 153 is thus brought to a stop, and the flow of light emission processes comes to an end.

The light emission amount control in the manual light emission mode is next described below with reference to FIG. 10 which is a flow chart.

<Manual Light Emission Mode>

Figure 10:
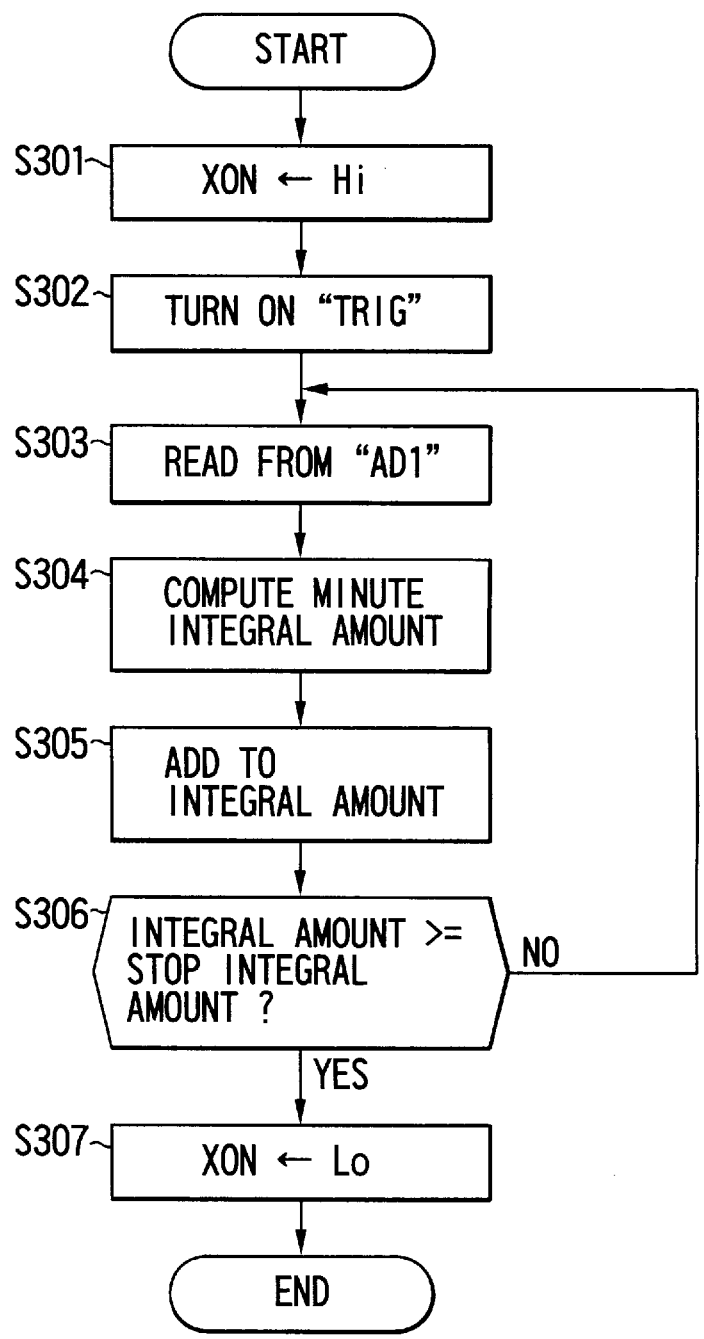
FIG. 10 is a flow chart showing a computing operation of the operational integrating action during a manual light control mode in the second embodiment of the invention.

Referring to FIG. 10, when the manual light emission mode is selected by the mode setting switch 162, the microcomputer 145 controls the amount of light emission by using the light receiving element 157 which receives light directly from the xenon tube 153.

At a step S301, when the level of the input terminal XIN which is a light emission trigger input terminal becomes low, the microcomputer 145 sets the terminal XON at a high level to bring the light emission control circuit 142 into a conductive state in preparation for light emission.

At a step S302, the terminal TRIG is set at a high level (Hi) for a predetermined period of time to generate a high voltage at the trigger circuit 141. The xenon tube 153 is excited by the high voltage and is thus caused to begin to emit light.

At a step S303, the output of the light receiving circuit 161 which receives light directly from the xenon tube 153 is read through the input terminal AD1 at predetermined sampling intervals. The output thus read is converted into a digital signal.

At a step S304, a minute integral amount Δi within each predetermined sampling interval is obtained in accordance with the following formula from the output of the light receiving circuit 161 read at the step S303:

$$\text{minute integral amount } \Delta i = \{(h1+h2) * \Delta t\}/2$$

wherein h1: an A/D converted value obtained last time, h2: an A/D converted value obtained this time, and Δt: a sampling interval.

Further, the A/D converted value is preferably subjected to a computing (arithmetic) operation process for logarithmic conversion and also to the operational process for eliminating the adverse effect of noises, in the same manner as in the case of the first embodiment described above.

At a step S305, an integral amount "int" which corresponds to the amount of light emission from the commencement of the light emission is obtained by adding the minute integral amount Δi obtained at the step S304 to a total integral amount, as expressed below:

$$\text{integral amount } int = int + \Delta i.$$

At a step S306, the integral amount "int" obtained at the step S305 is compared with a read value of a light-emission stopping integral amount written in the EEPROM 146 at the time of adjustment. If the integral amount "int" is found to be equal to or larger than the data stored in the EEPROM 146, the flow proceeds to a step S307. If the EEPROM-stored data is found not to be larger than the integral amount "int", the flow returns to the step S303 to repeat the above-stated operational integrating process.

At the step S307, the level of the terminal XON is inverted to a low level to bring the light emission control circuit 142 into a cut-off state. The light emission by the xenon tube 153 is thus brought to a stop, and the flow of light emission processes comes to an end.

As described above, according to the arrangement of the second embodiment, without recourse to an integrating circuit for controlling the amount of light emission, the amount of light emission can be controlled by causing the output of photo-electric conversion means which converts the light emission of the xenon tube into an electrical signal to be directly A/D converted in real time into a digital value at predetermined sampling intervals, and by performing a computing operation to obtain an integral amount of light emission on the basis of the digital value thus obtained. The amount of light emission from the flash device thus can be adequately controlled without necessitating use of any integrating circuit that must be arranged to handle minute signals.

Another advantage of the second embodiment lies in the following point. The control circuit of the flash device can be simplified to a great extent according to the arrangement of the second embodiment, because the A/D conversion output which is obtained by A/D converting the output of the light receiving circuit, i.e., an output of a light receiving element, is logarithmically converted by a computing process, so that the light output can be logarithmically converted without recourse to an expensive logarithmic conversion circuit which is extremely sensitive to temperature.

A further advantage of the second embodiment lies in that a light emission stopping level at which the light emission is to be brought to a stop through the operational integrating process is arranged to be stored in storage means such as an EEPROM or the like at the time of carrying out adjustment work. This arrangement permits electrical adjustment without recourse to adjustment means such as a variable resistor or the like, so that the process of adjustment can be simplified.

A still further advantage of the embodiment lies in the following arrangement. The A/D converted data currently sampled is compared with the A/D converted data which is obtained the previous several times. If the result of the comparison indicates an adverse effect of a noise, the A/D converted data currently obtained is corrected through the computing operation steps described above. That arrangement permits highly accurate light emission control by accurately carrying out the integrating process without any adverse effect of noises.

In addition to the above-stated advantages, the second embodiment is arranged to permit direct reading of the light emission output of the xenon tube in the manual light emission mode in which the flash device is caused to emit light in an amount designated. Therefore, the control circuit for the manual light emission mode can be simplified to a great extent.

(Third Embodiment)

A third embodiment of the invention is a camera-flash device system in which the invention is applied to the flash device arranged to make preliminary light emission toward a photographing object and to decide the amount of main light emission according to a reflected light coming from the object as a result of the preliminary light emission.

Figure 11:
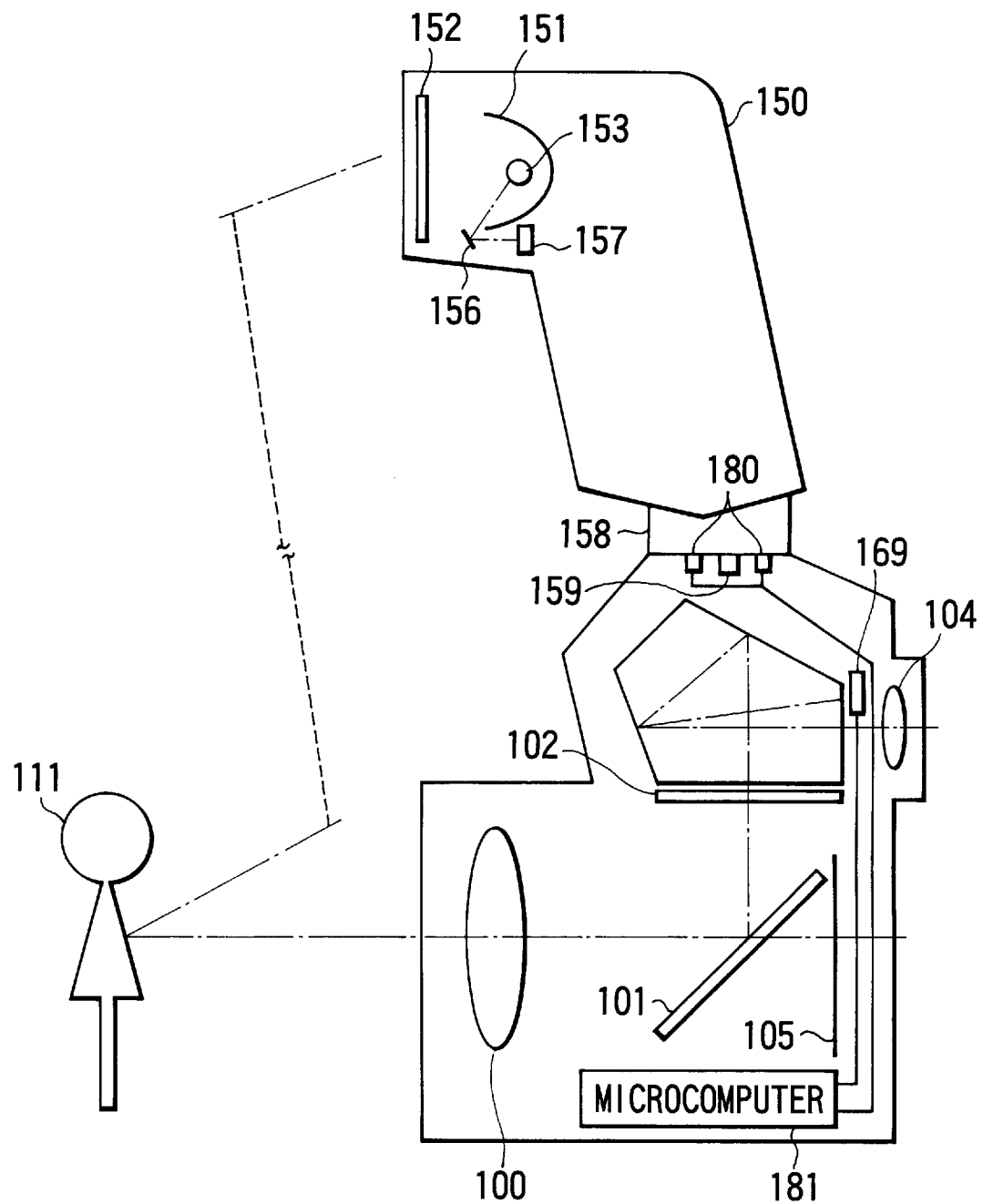
FIG. 11 schematically shows the arrangement of a camera-flash device system according to a third embodiment of the invention.

FIG. 11 shows the arrangement of the whole camera-flash device system according to the third embodiment of the invention. The same members as those shown in FIGS. 1 and 7 are indicated by the same reference numerals and their details are omitted from the following description of the third embodiment.

Referring to FIG. 11, a light receiving element 169 is provided for measuring a natural light and the light of the flash device. A contact group 180 is provided for known serial communication between the camera and the flash device. A microcomputer 181 is arranged to control the actions of the camera.

Figure 12:
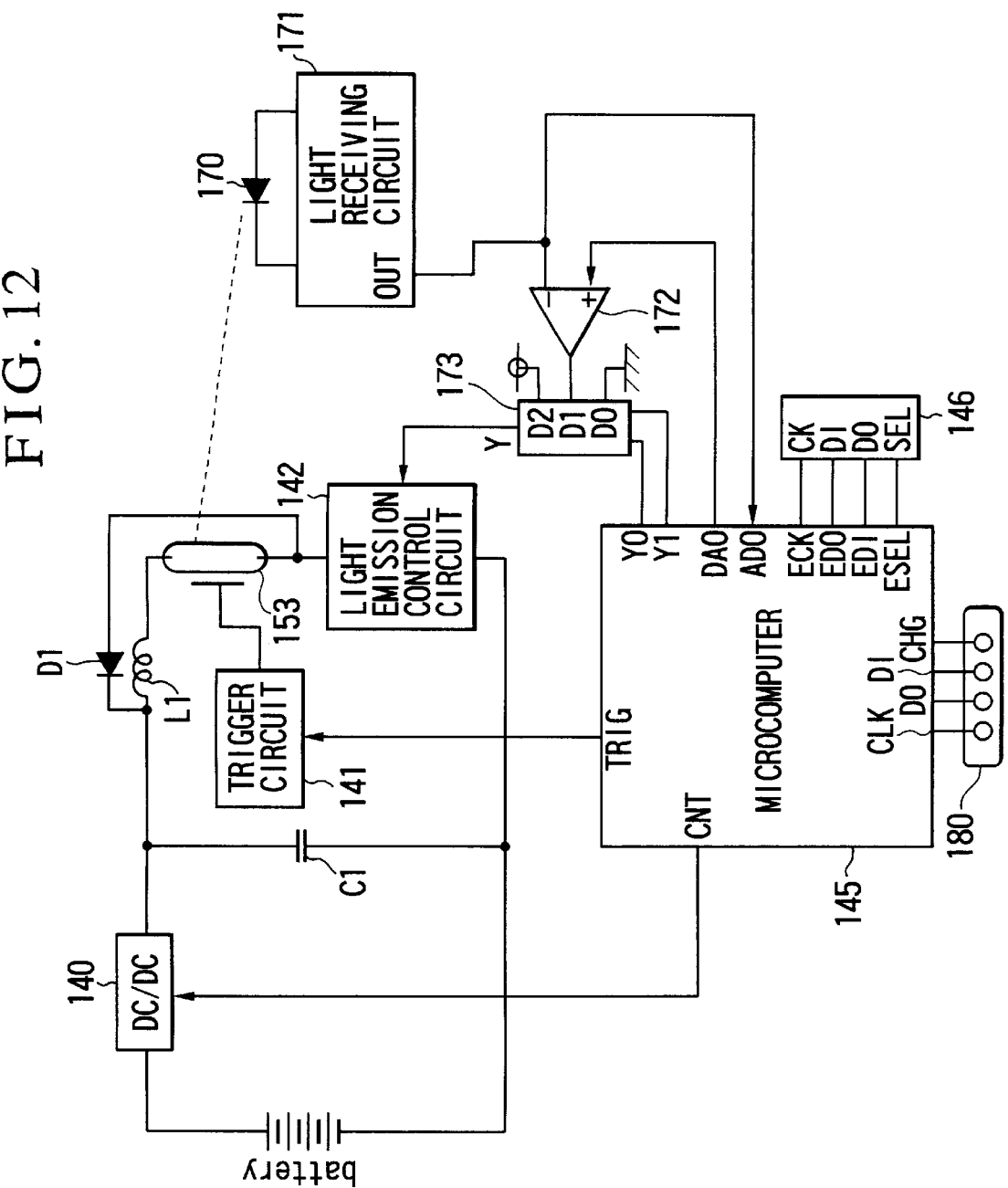
FIG. 12 is a block diagram showing the circuit arrangement of a flash device according to the third embodiment of the invention.

FIG. 12 shows the circuit arrangement of the flash device of the camera-flash device system shown in FIG. 11. In FIG. 12, the same members as those shown in FIGS. 2 and 8 are indicated by the same reference numerals and their details are omitted from the following description.

In FIG. 12, a light receiving element 170 is the light receiving element 157 shown in FIG. 11. The light receiving element 170 is identical with the light receiving element 107 shown in FIG. 2 and is arranged to directly monitor the light generated by the xenon tube 153. A light receiving circuit 171 is identical with the light receiving circuit 108 shown in FIG. 2. A comparator 172 is provided for control over a flat light emission. A data selector 173 is provided for selection of data.

A microcomputer 145 included in the circuit arrangement of the flash device of the third embodiment is provided with some terminals in addition to the terminals of the microcomputer 145 in the first embodiment shown in FIG. 2. These additional terminals are arranged as follows.

Terminals CLK, DO, DI and CHG are provided for serial communication with the camera and are arranged to form the contact group 180 disposed in the leg part 158 of the flash device. More specifically, the terminal CLK is a clock signal input terminal arranged for synchronizing the serial communication in a known manner. The terminal DO is a serial data output terminal. The terminal DI is a serial data input terminal. The terminal CHG is a communication terminal provided for informing the camera of completion of a process of charging the flash device by pulling a current in. The terminal DAO is a D/A (digital-to-analog) output terminal which is provided for setting a peak value of the flat light emission by converting a digital signal within the microcomputer 145 into an analog signal (voltage) and by outputting the analog signal through this terminal.

The operation of the flash device arranged as described above is next described below with reference to FIGS. 13(A) and 13(B).

Figure 13A:
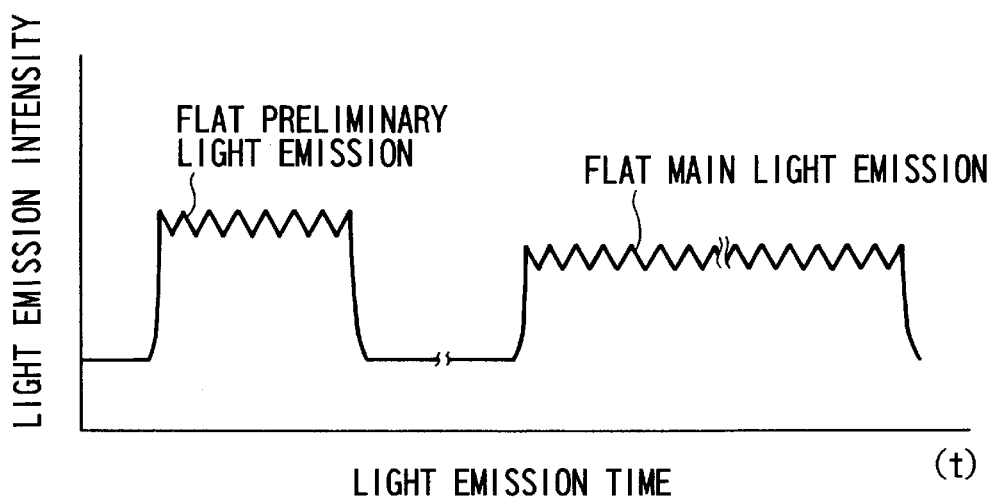
FIGS. 13(A) and 13(B) show waveforms obtained under the light emission control in the third embodiment of the invention.
Figure 13B:
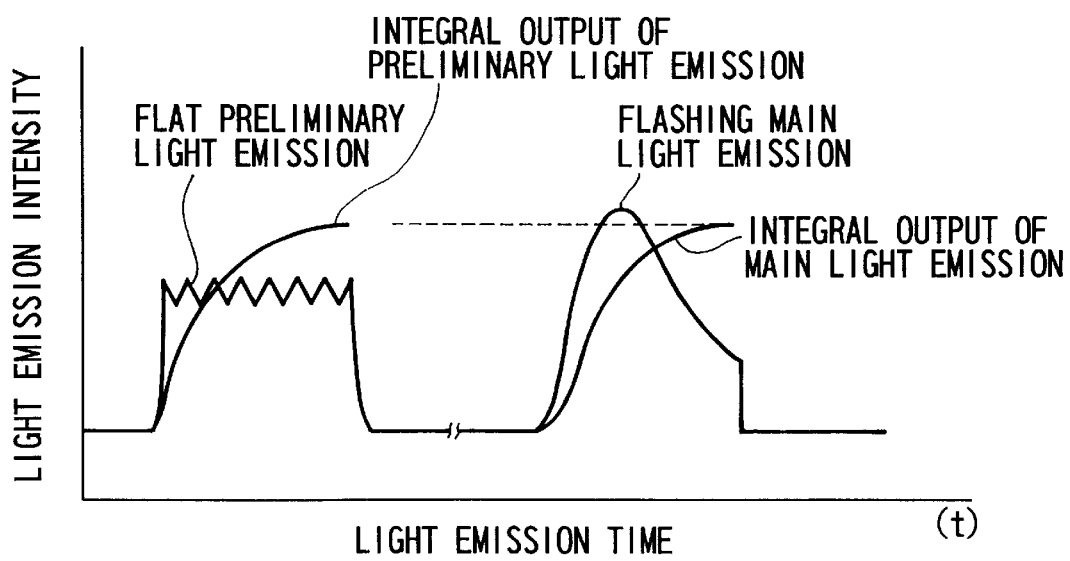

FIG. 13(A) shows a case where a flat main light emission is made after a flat preliminary light emission. In this case, the light emission control is performed when a shutter speed of the camera higher than a synchronizing shutter speed is selected. FIG. 13(B) shows another case where a flashing main light emission is made after the flat preliminary light emission. In that case, the light emission control is performed for a shutter speed of the camera lower than the synchronizing shutter speed.

<Flat Preliminary Light Emission>

In making the flat preliminary light emission, the terminals Y1 and Y0 provided in the microcomputer 145 for control over the data selector 173 are respectively set at "0" and "1". Then, an input D1 from the comparator 172 is selected at the output Y of the data selector 173. When a voltage corresponding to a desired light emission intensity value is outputted from the terminal DAO while setting the terminals Y1 and Y0 at "0" and "1" prior to light emission, the output of the light receiving circuit 171 is at a low level, since the xenon tube 153 has not yet begun to emit light. The level of the output of the comparator 172 then becomes high. The high level output of the comparator 172 is supplied to the light emission control circuit 142 to render the light emission control circuit 142 conductive.

A high level signal is next sent out from the terminal TRIG to cause a high voltage to be generated at the trigger circuit 141. The xenon tube 153 is excited by the high voltage to begin to emit light. The output of the light receiving circuit 171 then increases. When the output of the light receiving circuit 171 becomes higher than the output from the terminal DAO, the output of the comparator 172 is inverted to become low. As a result, the continuity of the light emission control circuit 142 is cut off.

With the light emission control circuit 142 put into a cut-off state, energy accumulated at a current limiting coil L1 comes to be circulated through a diode D1. However, the amount of light emission by the xenon tube 153 decreases as the energy accumulated at the coil L1 disappears. At the same time, the output of the light receiving circuit 171 also decreases. When the output of the light receiving circuit 171 becomes lower than a predetermined comparison voltage supplied from the terminal DAO of the microcomputer 145, the level of the output of the comparator 172 again becomes high to render the light emission control circuit 142 conductive. As a result, the amount of light emission by the xenon tube 153 again increases.

With these processes repeated, the flat light emission can be carried on at about a constant intensity.

After the lapse of a predetermined period of light emission time, the terminals Y1 and Y0 are set at "0" and "0" to cause the data selector 173 to select an input D0, i.e., a low level, at its output Y. As a result, the light emission control circuit 142 is forcibly brought into a cut-off state to bring the light emission to an end.

<Flat Main Light Emission>

The microcomputer 181 which is a control circuit disposed on the side of the camera measures, through the light receiving element 169, a reflected light coming from the object as a result of the flat preliminary light emission. The microcomputer 181 computes the intensity of the flat main light emission to be made following the flat preliminary light emission and then informs the flash device of the computed intensity of the flat main light emission by the serial communication in a known manner. Since the flat preliminary light emission gives the same effect as illumination of the object with a natural light, a value of deviation from an apposite quantity of light can be obtained by measuring the reflected light in the same manner as in the case of natural light. The value of deviation thus obtained can be used as the light emission intensity for the flat main light emission. Therefore, the microcomputer 145 of the flash device outputs from the terminal DAO a voltage which corresponds to the light emission intensity for the flat main light emission. The microcomputer 145 then causes the flat light emission to be made over a period of time corresponding to the shutter speed. The light emission apposite to a high shutter speed thus can be forcibly carried out. Further, since the flat main light emission is controlled in the same manner as the control over the flat preliminary light emission, the details of the control are omitted here.

<Flashing Main Light Emission>

In cases where the shutter speed selected is slower than the synchronizing shutter speed, the main light emission is controlled to make it in a flashing manner. The flashing main light emission is controlled as follows.

Figure 14:
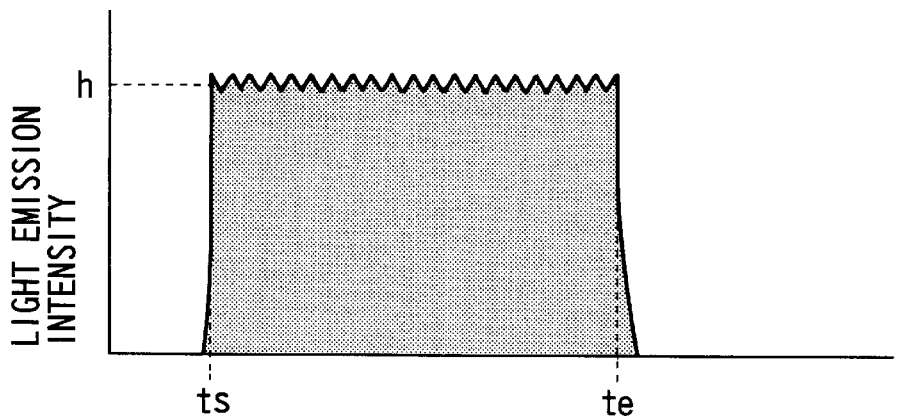
FIGS. 14(A), 14(B) and 14(C) are diagrams for explaining an operational integrating action for a flat preliminary light emission in the third embodiment of the invention.
Figure 14:
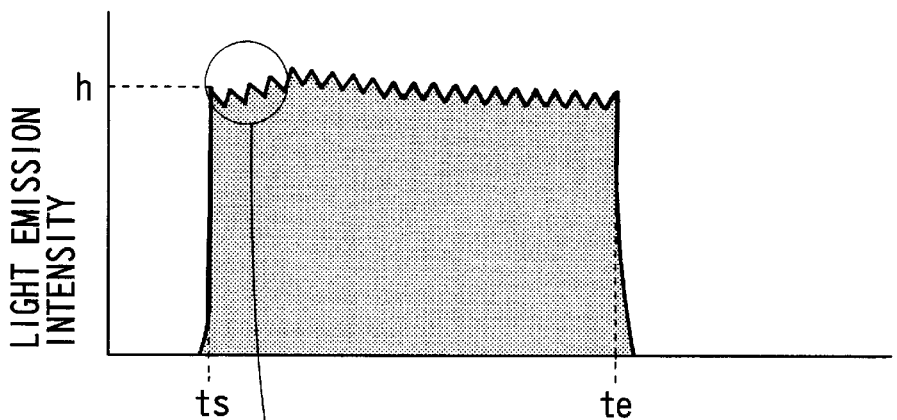
Figure 14C:
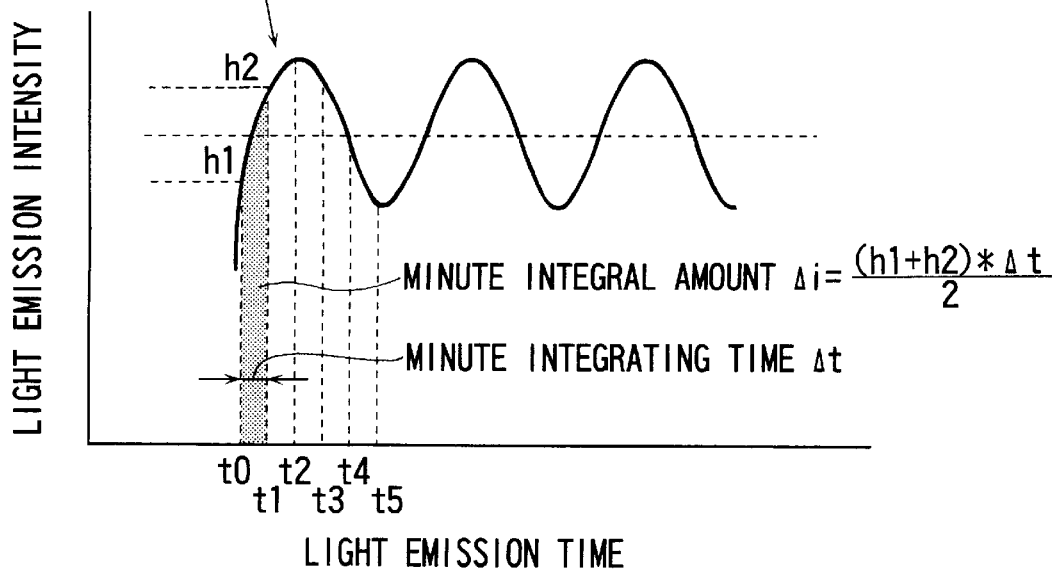
Figure 15:
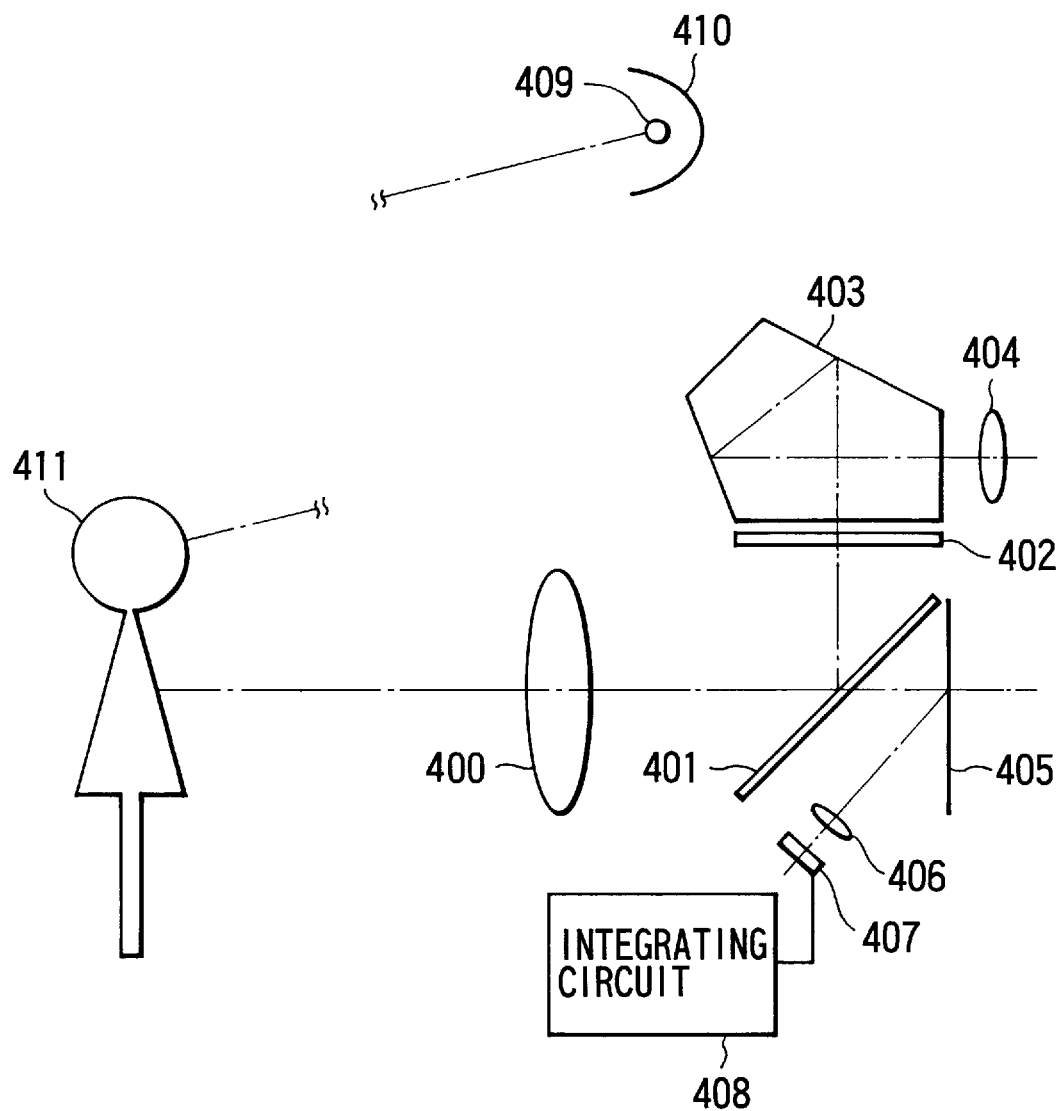
FIG. 15 is a layout view schematically showing optical elements of a conventional camera-flash device system of the TTL light control type.
Figure 16:
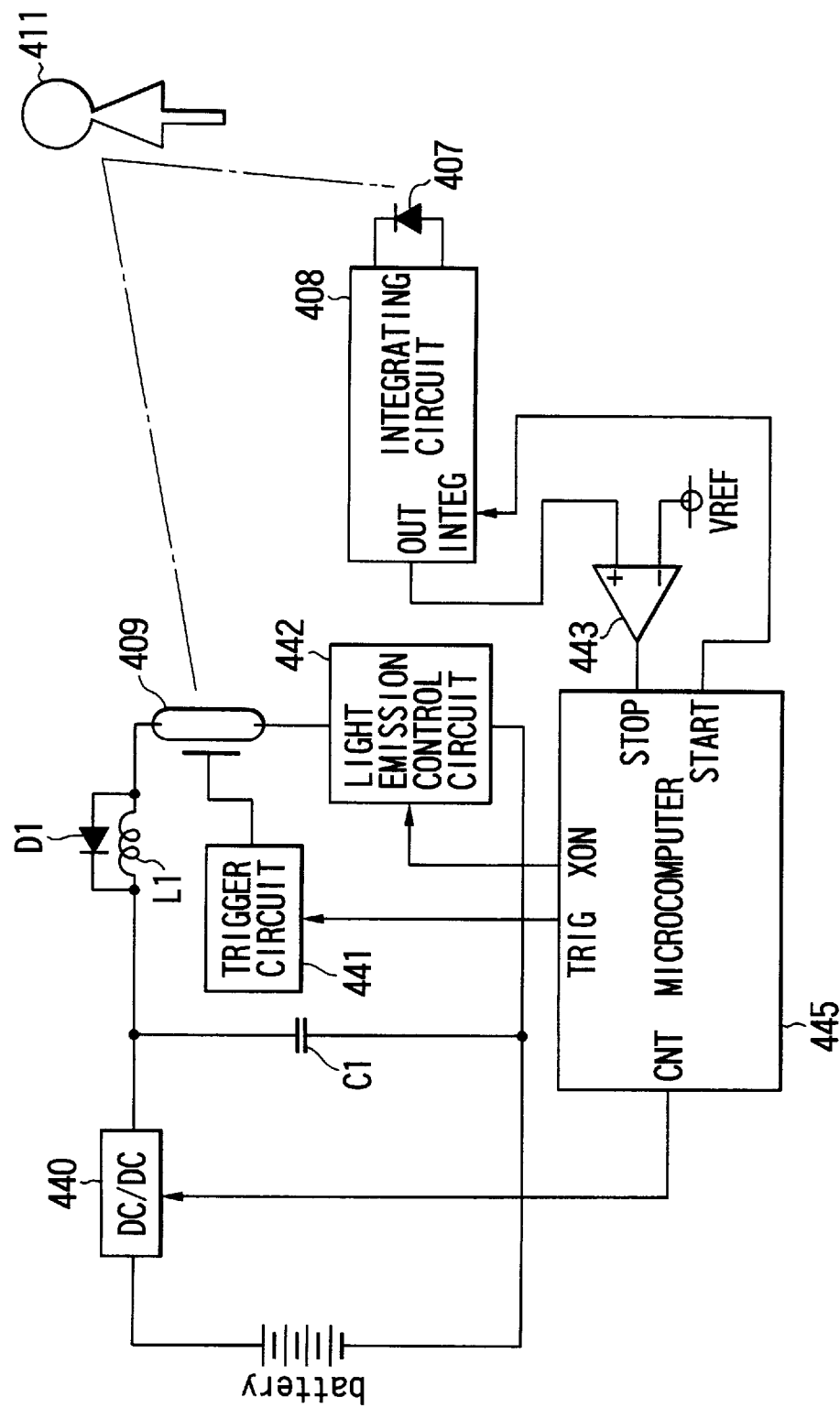
FIG. 16 is a block diagram showing the circuit arrangement of a conventional flash device.
Figure 17:
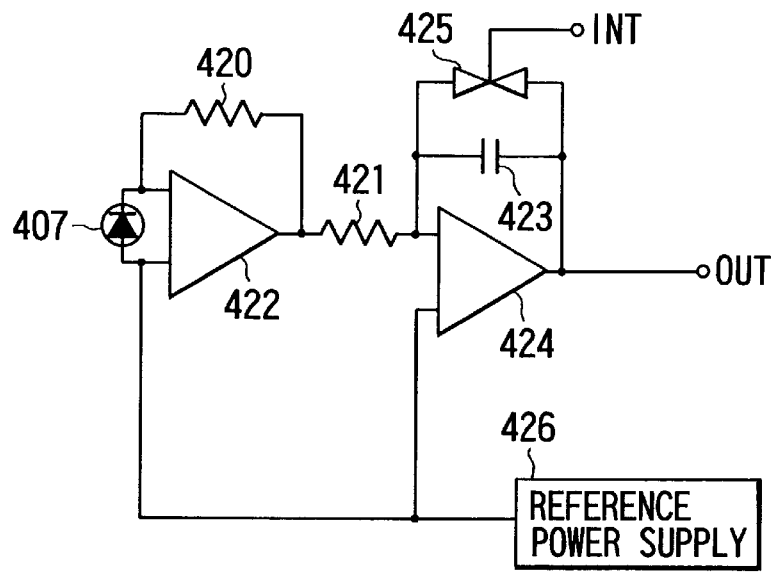
FIG. 17 is a circuit diagram showing in detail a light receiving circuit shown in FIG. 16.
Figure 18:
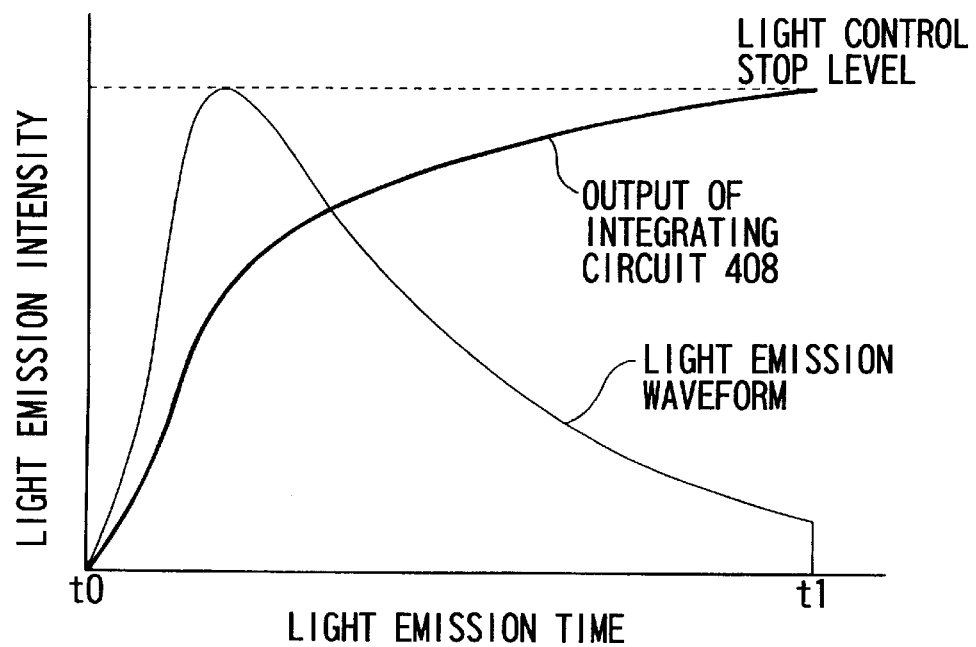
FIG. 18 is a diagram for explaining a conventional TTL integration.

Since no integrating process is required for light emission control over the flat preliminary light emission and the flat main light emission, the integrating process is omitted in the description given above. In actuality, however, the microcomputer 145 of the flash device performs an operational integrating process, in the same manner as in the first and second embodiments, by reading the output of the light receiving circuit 171 through the input terminal AD0. FIGS. 14(A), 14(B) and 14(C) show how this process is carried out.

FIG. 14(A) shows the flat preliminary light emission as being performed in an ideal manner. In actuality, however, the flat preliminary light emission has some waved portion due to reasons such as instability of discharge at the commencement of light emission, as shown in FIG. 14(B). Therefore, for accurately obtaining an integral amount of light emission of the flat preliminary light emission, a total integral amount of light emission is obtained by computing a minute integral amount at predetermined sampling intervals and by adding up the minute integral amounts thus obtained, as shown in FIG. 14(C).

In controlling the flashing main light emission, when the terminals Y1 and Y0 are set at "1" and "0", an input D2, i.e., a high level input, is selected for the output Y of the data selector 173. The high level output Y of the data selector 173 then forcibly brings the light emission control circuit 142 into a conductive state. A high level signal is next outputted from the terminal TRIG for a predetermined period of time to cause the trigger circuit 141 to generate a high voltage. The high voltage excites the xenon tube 153 to begin emitting light. When the light emission begins, the microcomputer 145 obtains a minute integral amount by reading the output of the light receiving circuit 171 via the input terminal AD0 at each predetermined sampling interval and adds the minute integral amount to the total integral amount in the same manner as in the cases of the first and second embodiments described in the foregoing. By virtue of this operation, a computed integral amount can be adequately obtained in real time.

When the computed integral amount reaches a predetermined integral amount, outputs "0" and "0" are instantly supplied from the terminals Y1 and Y0 to the data selector 173 to cut off the continuity of the light emission control circuit 142. Then, the light emission is brought to a stop. The control over the flashing main light emission thus can be accomplished as desired.

The computing method to be carried out in the operational integration process for the flat preliminary light emission and the flashing main light emission is the same as in the first and second embodiments described above and is, therefore, omitted from description.

As described in the foregoing, according to the arrangement of the third embodiment, without recourse to an integrating circuit for controlling the amount of light emission, the amount of light emission can be controlled by causing the output of photo-electric conversion means which converts the light emission of the xenon tube into an electrical signal to be directly A/D converted in real time into a digital value at predetermined sampling intervals, and by performing a computing operation to obtain an integral amount of light emission on the basis of the digital value thus obtained. The amount of light emission from the flash device thus can be adequately controlled without necessitating use of any integrating circuit that must be arranged to handle minute signals.

Another advantage of the third embodiment lies in the following point. The control circuit of the flash device can be simplified to a great extent according to the arrangement of the embodiment, because the A/D conversion output which is obtained by A/D converting the output of the light receiving circuit, i.e., an output of a light receiving element, is logarithmically converted by a computing process, so that the light output can be logarithmically converted without recourse to an expensive logarithmic conversion circuit which is extremely sensitive to temperature.

A further advantage of the third embodiment lies in that a light emission stopping level at which the light emission is to be brought to a stop through the operational integrating process is arranged to be stored in storage means such as an EEPROM or the like at the time of carrying out adjustment work. This arrangement permits electrical adjustment without recourse to adjustment means such as a variable resistor or the like, so that the process of adjustment can be simplified.

A still further advantage of the third embodiment lies in the following arrangement. The A/D converted data currently sampled is compared with the A/D converted data obtained the previous several times. If the result of the comparison indicates an adverse effect of a noise, the A/D converted data currently obtained is corrected through some computing operation step. That arrangement permits highly accurate light emission control by accurately carrying out the integrating process without any adverse effect of noises.

Further, according to the arrangement of the third embodiment, in a flash device system of the kind deciding a main light emission amount by measuring a reflected light coming from a photographing object as a result of flat preliminary light emission and controlling the mode and the amount of the main light emission on the basis of the main light emission amount thus decided, the light emission amount can be controlled by directly reading the light emission output of a xenon tube, by A/D converting the output and by carrying out a computing (operational) integrating process on the A/D converted output, so that the control circuit of the system can be greatly simplified.

This invention has been described above as being applied to a flash device which is either incorporated in or mounted on a single-lens reflex camera. However, this invention is not limited to the embodiments disclosed but is applicable also to cameras of other kinds.

While the EEPROM 146 is employed as storage means, some rewritable type flash ROM may be employed as storage means in place of the EEPROM 146.

Further this invention may be carried out by suitably combining the embodiments or their technological elements disclosed in the foregoing.

I claim:

1. A flash photographing system composed of a flash device and a camera and controlling a light emitting action by detecting an amount of light received at a light receiving circuit arranged to receive a reflected light from an object caused by a light flux emitted from a light emission source, comprising:

an analog-to-digital conversion circuit which converts an analog output signal of said light receiving circuit into a digital value;

an addition circuit which performs a process of adding up values corresponding to digital values obtained by said analog-to-digital conversion circuit at intervals of a predetermined timing; and a light emitting action control circuit which controls the light emitting action on the basis of a value obtained by said adding process of said addition circuit.

2. A flash photographing system according to claim 1, wherein said flash photographing system has a microcomputer and, wherein said analog-to-digital conversion circuit is constituted by an analog-to-digital converting process function of said microcomputer, and said addition circuit is constituted by an adding process function of said microcomputer.

3. A flash photographing system according to claim 2, wherein said light receiving circuit is arranged to receive the reflected light passing through a photo-taking lens and reflected by a film surface.

4. A flash photographing system according to claim 1, wherein, if a value corresponding to a latest digital value among the digital values obtained at intervals of the predetermined timing is in a predetermined relation to a value corresponding to a digital value obtained prior to the latest digital value, said addition circuit omits the latest digital value from data to be subjected to said adding process.

5. A flash photographing system according to claim 4, wherein when omitting the latest digital value from data to be subjected to said adding process, said addition circuit uses, for said adding process, data prepared on the basis of a digital value obtained prior to the latest digital value.

6. A flash photographing system composed of a flash device and a camera and controlling a light emitting action by detecting an amount of light received at a light receiving circuit arranged to receive a light flux emitted from a light emission source, comprising:

an analog-to-digital conversion circuit which converts an analog output signal of said light receiving circuit into a digital value;

an addition circuit which performs a process of adding up values corresponding to digital values obtained by said analog-to-digital conversion circuit at intervals of a predetermined timing; and a light emitting action control circuit which controls the light emitting action on the basis of a value obtained by said adding process of said addition circuit.

7. A flash photographing system according to claim 6, wherein said flash photographing system has a microcomputer and, wherein said analog-to-digital conversion circuit is constituted by an analog-to-digital converting process function of said microcomputer, and said addition circuit is constituted by an adding process function of said microcomputer.

8. A flash photographing system according to claim 6, wherein, if a value corresponding to a latest digital value among the digital values obtained at intervals of the predetermined timing is in a predetermined relation to a value corresponding to a digital value obtained prior to the latest digital value, said addition circuit omits the latest digital value from data to be subjected to said adding process.

9. A flash photographing system according to claim 8, wherein when omitting the latest digital value from data to be subjected to said adding process, said addition circuit uses, for said adding process, data prepared on the basis of a digital value obtained prior to the latest digital value.

* * * * *